INVENTORS  
Wilbur B. Rayton and Gustav A. H. Kellner, deceased,  
by Carl F. Lomb, executor.  
BY  
their ATTORNEYS

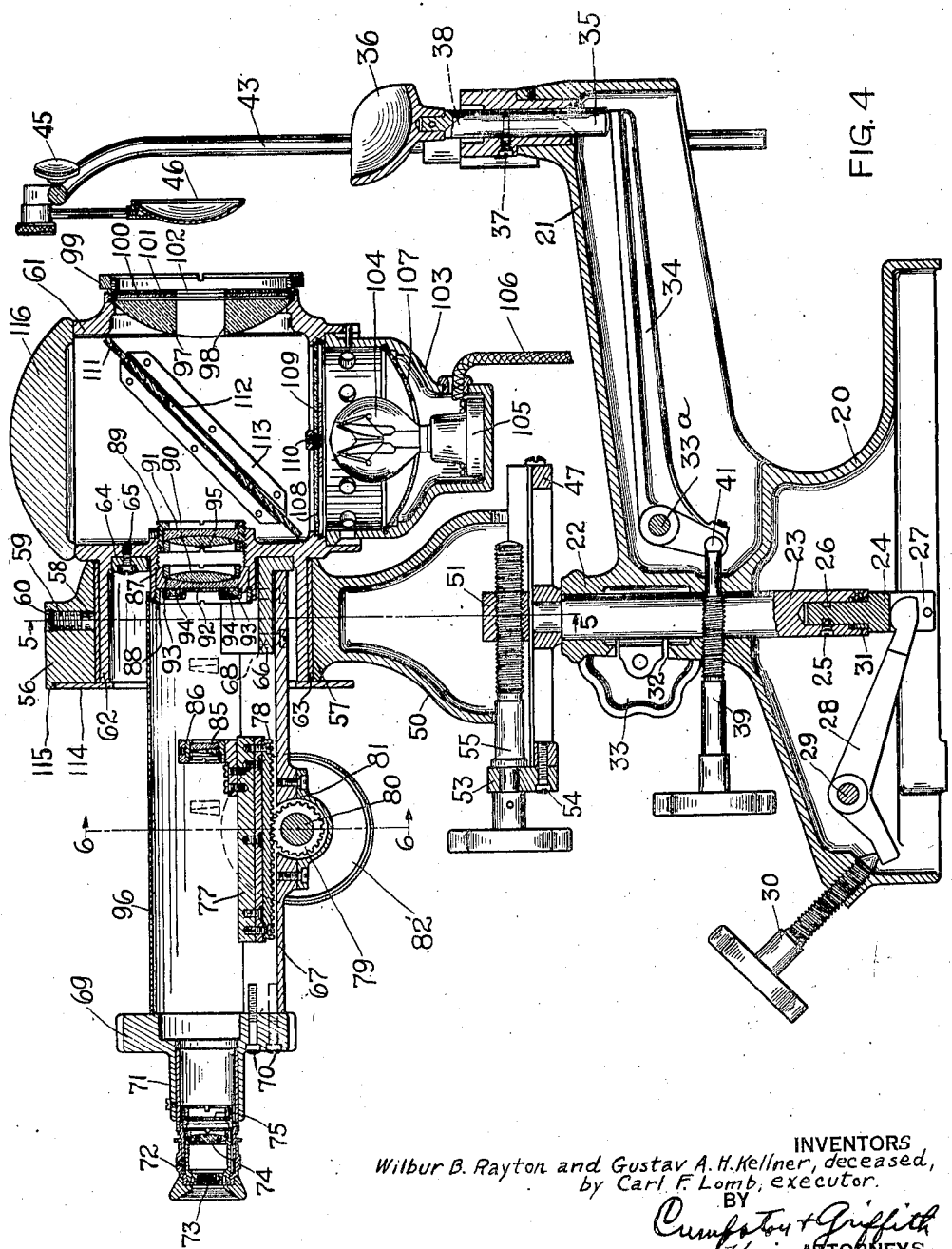

March 18, 1930.   G. A. H. KELLNER ET AL   1,750,931
OPHTHALMOMETER
Filed July 7, 1927   3 Sheets-Sheet 3
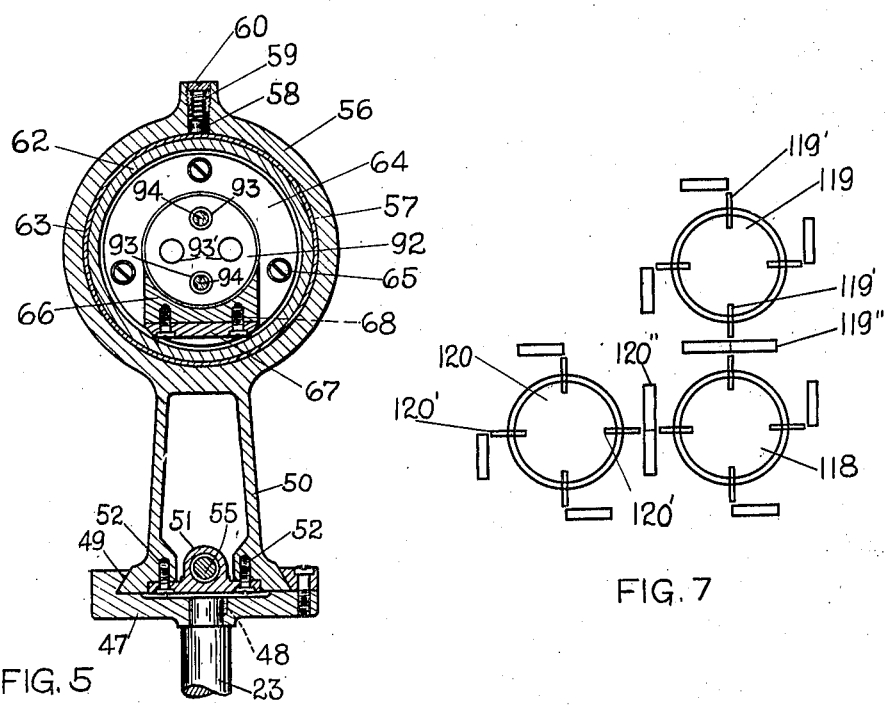
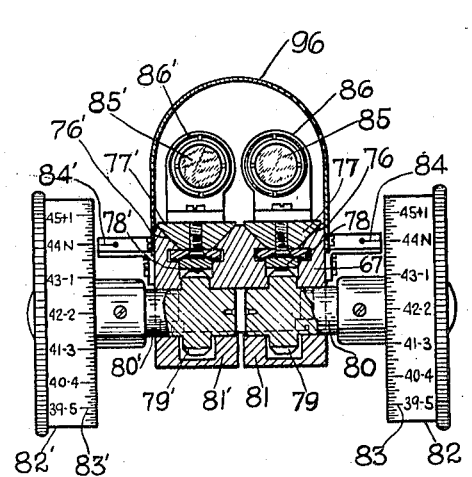
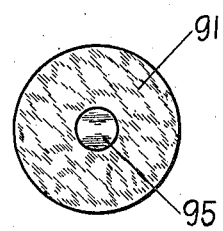
INVENTORS
Wilbur B. Rayton and Gustav A. H. Kellner, deceased,
by Carl F. Lomb, executor.
BY
their ATTORNEYS Patented Mar. 18, 1930

1,750,931

UNITED STATES PATENT OFFICE

GUSTAV A. H. KELLNER, DECEASED, LATE OF ROCHESTER, NEW YORK, BY CARL F. LOMB, EXECUTOR, OF ROCHESTER, NEW YORK, AND WILBUR B. RAYTON, OF ROCHESTER, NEW YORK, ASSIGNORS TO BAUSCH & LOMB OPTICAL COMPANY, OF ROCHESTER, NEW YORK, A CORPORATION OF NEW YORK

OPHTHALMOMETER

Application filed July 7, 1927. Serial No. 204,089.

This invention relates to improvements in ophthalmic instruments which are used to determine refractive errors of the eye. More particularly it has reference to an instrument which is used for the purpose of determining the radii of curvature of the cornea of the eye.

One of the most important objects of the present invention is to provide a compact, unitary instrument of the character described which will afford means for conveniently and efficiently determining the corneal astigmatism of the eye.

Another object is to provide a means whereby corneal curvatures may be measured in two meridians with one setting of the unit.

Another object is to provide improved means for fixing the focus of the instrument and the position of the patient's eye while measurements of the cornea are being made.

Other objects are to provide an improved target illuminating device and means whereby settings of the instrument can be made accurately.

Other objects and advantages reside in certain novel features of construction, arrangement and combination of parts, which will hereinafter be more fully described and pointed out in the appended claims.

Referring to the drawings:

Fig. 4 is substantially a longitudinal sectional view of the instrument, with parts in elevation.

Fig. 5 is a sectional view taken on line 5—5 of Fig. 4.

Fig. 6 is a sectional view on line 6—6 of Fig. 4 with parts shown in elevation.

Fig. 7 is a diagrammatic view showing the relation of the target images, as seen in the ocular, when the instrument has been set for a determination.

Fig. 8 is a face view of one of the collective lenses of the optical system, showing a centrally disposed silvered area.

Similar reference numerals indicate the same parts throughout the several views of the drawings.

Figure 1:
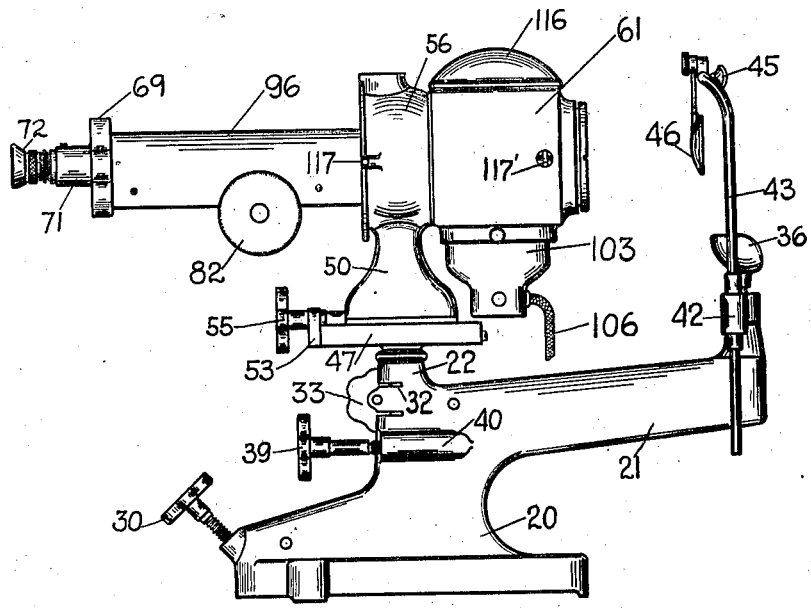
Fig. 1 is a side elevational view of the assembled instrument.
Figure 2:
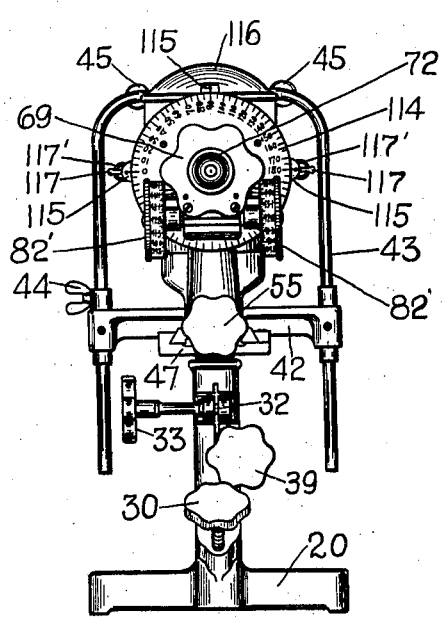
Fig. 2 is an end elevational view showing the instrument as seen from the left of Fig. 1.

A preferred embodiment of my invention is illustrated in the drawings, wherein 20 indicates a unitary casting of hollowed construction which serves as a base for the instrument. A laterally projecting arm 21 is integral with the base 20 and serves as a support for the head and chin rests to be hereinafter described.

The base 20 includes a tubular portion 22 in which is rotatably mounted the rod 23 which supports the measuring unit of the instrument. The pintle member 24 is non-rotatable and provides a thrust bearing for the rod 23, the two elements being held together by means of a screw 25 which cooperates with the circular groove 26 so as to permit rotation of the rod 23 about the member 24. The lower end of member 24 is slotted as at 27 to receive one end of the bell crank lever 28 which is pivotally mounted on pin 29 carried by the base 20.

An adjusting screw 30 is threaded into base 20 and cooperates with one end of the bell crank lever 28 to raise and lower the rod 23 together with the measuring unit of the instrument. A split collar 31 provides frictional engagement between the pintle member 24 and the rotatable rod 23 so that the instrument will not rotate too freely about the vertical axis. Thus, if the instrument has been adjusted by rotation about the vertical axis, any slight jarring, occasioned by a subsequent raising or lowering of the instrument, will not cause the instrument to be thrown out of adjustment.

The tubular portion 22 of base 20 is slotted as at 32 and provided with screw means 33 for clamping the rod 23 in fixed position.

The arm 21 carries the pin 33ᵃ on which is pivotally mounted the bell crank lever 34. One end of the lever 34 cooperates with a vertical rod 35 which is slidably mounted at the end of arm 21. The upper end of rod 35 carries the chin rest 36 and rotation of the rod is prevented by the cooperation of pin 37 with the slot 38. The adjusting screw 39 is threaded into an offset lug 40 on the base 20 and cooperates with a pin 41 carried by the lever 34, whereby the chin rest may be raised and lowered by manipulating screw 39.

Figure 3:
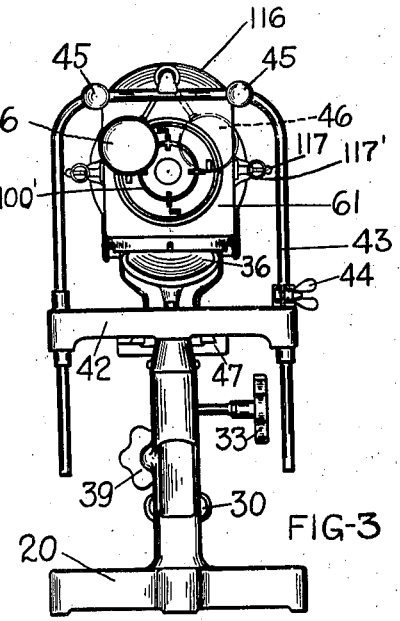
Fig. 3 is an end elevational view as seen from the right of Fig. 1.

Arm 21 carries a transversely extending member 42 having openings at each end for slidably receiving the vertical portions of an inverted U-shaped rod member 43 which is held in adjusted position by means of clamping screw 44. The upper portion of member 43 carries two contact buttons 45 which are movably mounted on ball and socket joints to permit proper contact with the forehead of the patient. Member 43 also carries a disk 46 which is swingably mounted, as shown in Fig. 3, and adapted to cover the eye which is not being observed.

A horizontally disposed frame member 47 is rigidly secured to the rotatable rod 23 by means of a key 48 as shown in Fig. 5. Member 47 is provided with beveled guideways 49 for slidably receiving cooperating beveled portions at the lower part of the supporting column 50 which carries the measuring unit of the instrument. A threaded nut 51 is fixed to the lower part of column 50 by means of screws 52. A bearing plate 53 is secured to member 47 by means of screws 54 and receives the rotatable screw 55 which is held from axial movement. The screw 55 cooperates with the threaded nut 51 so that rotation of the screw 55 will cause a backward or forward movement of the column 50 along the slideways and thereby provide means for focusing the optical system to be hereinafter described.

The column 50 supports an enlarged portion 56 which is integral therewith and provided with a transverse opening 57 which serves as a bearing for the rotatable measuring unit which will be hereinafter described. A friction plug 58, adjustably held by spring 59 and screw 60, is provided at the top of the bearing portion 56 for the purpose of varying the friction upon the rotatable measuring unit.

The measuring unit is mounted in bearing 57 for rotation about a horizontal axis and comprises an optical system, a target unit and means for illuminating the target. A housing member 61 has a laterally extending flange member 62 which serves as a bearing member for the rotation of the measuring unit. In one embodiment of our invention, the housing member 61 is made of aluminum and in order to provide a satisfactory bearing with the brass bearing member 56, a seamless brass tube 63 is rigidly secured to flange 62 by shrinking.

An annular member 64 is attached to housing 61 by screws 65. The member 64 has an offset portion 66 to which the laterally extending support 67 is attached by means of screws 68. A member 69 is attached to support 67 by screws 70 and is provided with a tubular portion 71 which carries the ocular or eyepiece 72. The ocular comprises the lenses 73 and 74 which are mounted in a tube together with a reticule bearing glass plate 75.

The member 67 is provided with beveled longitudinal guide ways 76 and 76′ in which the cooperating members 77 and 77′ are slidably mounted. On the under side of members 77 and 77′, the racks 78 and 78′ are mounted for cooperative engagement with pinions 79 and 79′ which are fixedly carried by stub shafts 80 and 80′. Stub shafts 80 and 80′ are rotatably mounted in journal bearings 81 and 81′ formed on the under side of member 67. Indicating wheels 82, 82′ bearing scale graduations 83, 83′ are fixedly mounted on the outer ends of the stub shafts 80, 80′ and cooperate with the fixed indices 84, 84′. Prisms 85, 85′ are mounted in cells 86, 86′ which are carried at the ends of the slidable members 77 and 77′ whereby each prism may be independently moved back and forth, between the dotted line positions shown in Fig. 4, by rotating the respective wheels 82 and 82′. In the preferred embodiment, the prisms 85 and 85′ are achromatic and in the view of Fig. 6, the prism 85 has its base downward and prism 85′ has its base outward, to the left.

The housing member 61 carries a centrally disposed laterally projecting flange 87 into which are threaded the cells 88 and 89 carrying the achromatic collective lenses 90 and 91, respectively. Mounted in front of lens 90, is an opaque disk 92 which has two pairs of spaced openings 93 and 93′. The openings 93 are vertically disposed and openings 93′ horizontally disposed as shown in Fig. 5. The sum of the areas of the two openings 93 is equal to the area of one of the openings 93′. The openings 93 are provided with plane polished pieces of glass 94. On the inner surface of lens 91, a centrally disposed circular area is ground with a slightly flatter curve than the remainder of the surface. This circular area is then silvered, as indicated at 95, to provide a fixation means as will hereinafter be described. A sheet metal member 96 extending from flange 87 to member 69 forms a protective housing for the optical system.

At one side of the housing member 61, there is mounted a plano-convex lens 97 which is provided with a centrally disposed opening 98. A cell 99 is threaded into housing 61 and carries the target plate 100 with its cover glass 101. The target plate 100 bearing target device 100' consists of a photographic negative plate which is obtained by photographing a black target device on a white background. The gelatine layer of plate 100 is protected by cementing thereto the glass cover plate 101. The target plate 100 and its cover glass 101 are both provided with central openings 102 in register with the central opening 98 of the lens 97. Obviously, the target could be made otherwise, as it could be stamped from a sheet metal disk, for example.

A cup-shaped member 103 is removably attached to the lower side of housing 61 and carries a light source such as an incandescent lamp 104 held in receptacle 105 and supplied with current by lead wires 106. A centrally apertured reflector 107 cooperates with the lamp to direct light rays upward. At the lower side of housing 61 and above the lamp 104 there is mounted a ground glass diffusing plate 108 having a centrally disposed metal disk 109, attached thereto by means of a screw and nut 110, for the purpose of stopping out the central light rays from the lamp 104. A silvered reflector 111 having an elliptically-shaped central opening 112 is mounted in the housing 61 and is held in place by strips 113 attached to the opposite sides of the housing 61. The reflector 111 is inclined at an angle of approximately 45 degrees and extends across the interior of housing 61 with its opening in alignment with the collective lenses 90, 91, and the openings in the target unit, as clearly shown in Fig. 4. Light rays from the lamp 104 are directed upward and are reflected laterally by the reflector 111 through the lens 97 thereby illuminating the target plate 100.

By the above described arrangement of the target and illuminating means, it is possible to use a single light source for properly illuminating the target. This obviously results in a simplification of the illuminating system and is, as far as known, a departure from the usual method of employing a plurality of light sources for illuminating the target of an ophthalmometer.

The measuring unit, which comprises the optical system, target and illuminating means, is rotatable about a horizontal axis in order to locate properly the axes of the target with respect to the principal meridians of curvature of the eye under examination. The angular rotation of the unit is indicated by means of the graduated scale 114 which is secured by screws to the end of rotatable flange member 62 and cooperates with the fixed indices 115 on member 56. A relatively heavy casting 116 is mounted on top of casing 61 and serves to balance the unit and facilitate rotation thereof. Bead sights 117 are mounted on each side of member 56 to cooperate with sighting rings 117' mounted on each side of housing 61, thereby providing means for adjusting the axis of the measuring unit in the horizontal plane of the patient's eyes.

In using the instrument for measuring the corneal curvatures of a patient's eye, the eyepiece 72 is first adjusted so that the reticule on plate 75 is in focus, thereby correcting for any focal error in the eye of the observer. The patient is then placed with the chin on the rest 36 and the forehead contacting with the buttons 45. The chin rest and the measuring unit are then raised or lowered until the axis of the instrument is in the horizontal plane of the patient's eyes as determined by aligning the sights 117, 117' with the canthus of the patient's eye.

The disk 46 covers the eye which is not being observed, and with the other eye the patient looks through the central openings of the target unit and reflector 111 and sees the image of his eye reflected in the silvered area 95 on the inner face of the lens 91. The silvering 95 is applied to a central area which is ground with a flatter curve than the remainder of the surface. This increases the focal length of the silvered area so that the image of the eye which the patient sees appears to be about three feet distant. Since the central portion of the lens 91 is not otherwise used, as will hereinafter be described, we are able to provide this silvered area 95 without impairing the usefulness of the instrument.

In the practice of ophthalmometry it is very important that the eye under observation be held fixed during the measurements of the corneal curvature. Ophthalmometers which have hitherto been known have not, so far as we are aware, been provided with fixation devices. As a consequence it has been difficult to make measurements of corneal curvatures because it is difficult for the average person to keep his eye fixed without having some point or object upon which he can direct his gaze. The above described silvered area 95, however, provides an efficient means for fixing the focus and position of the eye during corneal measurements and constitutes an important feature of our invention.

Light rays from lamp 104 are laterally reflected by mirror 111 and pass through lens 97 to illuminate the target plate 100. The cornea of the patient's eye functions as a convex mirror to reflect the target image through the central openings 102 of the target unit and opening 112 of mirror 111 and into the optical system of the instrument. The ocular 72 together with collective lens 90 constitutes a telescope system focused for infinity, and the lens 91 serves as a collimating lens forming an image at infinity of the image which is reflected by the cornea. By means of screw 55 the entire measuring unit is moved toward or from the patient's cornea so that the magnified target image reflected from the cornea appears sharply focused to an observer looking into ocular 72.

Since the apertured disk 92 entirely covers the surface of lens 90, the only light rays which reach the ocular 72 are those which pass through the two pairs of openings 93 and 93′ in disk 92. As shown in Fig. 5, these openings are arranged peripherally so the central portion of the lens 90 is not utilized, thereby making it possible to place the silvered area 95 on the central portion of lens 91 without impairing the usefulness of the instrument.

The light rays which pass through the pair of vertically aligned openings 93 in the disk 92 do not enter either prism 85 or 85′ but form a fixed reference image of the target, indicated at 118 in Fig. 7. The light rays which pass through the horizontally aligned openings 93′ in disk 92 enter the prisms 85 and 85′. The rays from the right hand opening 93′ pass through the prism 85 and are vertically deviated to produce the target image 119, while rays from the left hand opening 93′ pass through prism 85′ and are horizontally deviated to produce the target image 120. The relative locations of the fixed image 118 and the two deviated images 119 and 120 are clearly shown in Fig. 7. Since rays from openings 93 do not pass through the prisms, a piece of glass 94 having plane polished surfaces is placed in each opening 93 in order to make the optical paths of rays from all of the openings in disk 92 substantially the same. The sum of the areas of the two openings 93 is equal to the area of one of the pair of openings 93′, whereby the three target images all have substantially the same brightness.

Since the fixed image 118 is formed by rays which pass through the two spaced apertures 93, two overlapping images will be formed when the optical system is not in focus. Hence we have provided a reliable focusing criterion since it is much easier for an observer to note the image doubling than to judge the sharpness of a single image.

By rotating the measuring unit about a horizontal axis upon its bearing 57, the two principal meridians of the target can be made parallel to the two principal meridians of the patient's cornea. When the instrument is thus properly adjusted with respect to the principal meridians of the eye, the vertical flagstaffs 119′ and the horizontal flagstaffs 120′ are aligned, respectively, with the vertical and horizontal flagstaffs of the fixed target image 118, as shown in Fig. 7. The angular location of the principal meridians of the eye is indicated by means of the graduated circle scale 114.

Prisms 85 and 85′ are then independently adjusted by means of hand wheels 82 and 82′ until the flags 119″ and 120″ are in aligned coincidence with the adjacent flags of the fixed image 118 as shown in Fig. 7. In our target device the flags are separated from the flagstaffs so that the longer sides of adjacent flags may be brought into alignment. This coincidence method of making a setting provides greater accuracy and increases the sensitiveness as the alignment of two objects can be determined with less difficulty than, for example, the tangency of two objects, which is the setting criterion used in some ophthalmometers.

Since the curvatures of the cornea can be determined from the positions of prisms 85 and 85′, the hand wheels 82 and 82′ are provided with scale graduations 83 and 83′ which give the corneal curvatures directly in diopters.

From the foregoing it will be apparent that we are able to attain the objects of our invention and provide a durable, unitary instrument which embodies the advantages of a one-position instrument, utilizes a novel fixation device, employs an improved target illuminating unit and embodies means whereby settings of the instrument can be accurately made, all of which are arranged and constructed to afford means for efficiently and accurately making measurements of the corneal curvatures of the eye.

Various modifications can be constructed without departing from the spirit of the invention and it is to be understood that the specification and drawings are to be interpreted as illustrative only, and not in any limiting sense.

We claim:

1. An ophthalmometer comprising supporting means and a measuring unit mounted thereon for rotation about a horizontal axis, said unit comprising an optical system, target means disposed in a circle, the optical axis of said system passing substantially through the center of said circle and a single light source for uniformly illuminating said target means.

2. An ophthalmometer comprising a support, a measuring unit mounted on said support, said unit comprising an ocular, circularly disposed target means, the optical axis of said ocular passing through the center of said target means, a collective lens positioned between said ocular and the plane of said target means, reflecting means positioned between said collective lens and said target means and a light source cooperating with said reflecting means to illuminate said target means.

3. In an ophthalmometer, the combination of an ocular and two spaced objective lenses, an opaque disk having spaced openings positioned between said ocular and said lenses and reflecting means on a surface of one of said lenses.

4. In an ophthalmometer the combination of an ocular, a collective lens, target means having a light-transmitting portion in alignment with the axis of said lens and reflecting means on a surface of said lens.

5. In an ophthalmometer, the combination of with an optical system comprising an ocular, a plurality of collective lenses and prisms mounted between said ocular and lenses, of an apertured disk covering a surface of one of said lenses and reflecting means on a surface of another of said lenses.

6. In an ophthalmometer, the combination of an ocular, collective lenses, adjustably mounted prisms between said ocular and said lenses, a perforated disk adjacent a surface of one of said lenses, a centrally disposed reflecting means on a surface of another of said lenses and a target plate having a central opening in alignment with said lenses.

7. In an ophthalmometer, the combination of an optical system, target means disposed around a line passing through the optical center of said system and means for fixing the gaze of an eye under observation, said last named means comprising a reflecting area adjacent the optical axis of said system.

8. In an ophthalmometer, the combination of an ocular and light collecting means, target means having a light-transmitting portion in alignment therewith, diaphragm means positioned between said ocular and collecting means, and reflecting means located between said collecting means and said target means.

9. In an ophthalmometer, the combination of an ocular, collective lenses, target means having an opening in alignment with said lenses, an apertured disk positioned between said ocular and said lenses and reflecting means located adjacent to said lenses and between said target means and said disk, whereby an object placed at the opening of the target means will be reflected by said reflecting means.

10. In an ophthalmometer, a target unit comprising a lens and a plate adjacent to said lens, said plate carrying target indicia, said lens and plate each having a central opening.

11. In an ophthalmometer, a target unit comprising a plano-convex lens, and a target plate adjacent the plano surface of said lens, said plate carrying target indicia.

12. In an ophthalmometer, the combination of an optical system, a target plate in alignment with said system, said plate having a central opening, reflecting means between said system and said plate and a light source cooperating with said reflecting means to illuminate said target plate.

13. In an ophthalmometer, a unit mounted for rotation about a horizontal axis, said unit comprising a housing and a laterally disposed member attached to said housing, an optical system carried by said member, target means mounted on said housing opposite the optical system for providing an image to be reflected by a patient's eye, said target means having a light-transmitting portion in alignment with the axis of said optical system, and means in said housing for illuminating said target means.

14. In an ophthalmometer, the combination of a target, lenses for producing an image of said target, an apertured disk adjacent one of said lenses, prisms cooperating with said lenses for producing deviated images of said target and means for adjusting said prisms whereby said deviated images are brought into aligned coincidence with said first mentioned image.

15. In an ophthalmometer, the combination of an ocular and collective lenses, two prisms adjustably mounted between said ocular and lenses, an apertured disk adjacent one of said lenses, target means in alignment with said lenses and means associated with each of said prisms for indicating, respectively, the corneal curvatures in two meridians.

16. In an ophthalmometer, the combination of an ocular, two spaced collective lenses, two prisms adjustably mounted between said ocular and said lenses, an opaque disk covering a surface of one of said lenses, said disk having four spaced openings, a centrally disposed reflecting area on a surface of the other of said lenses, a centrally apertured target plate in alignment with said lenses, an apertured reflector between said target plate and said lenses, and a light source cooperating with said reflector to illuminate said target plate.

17. In an ophthalmometer, the combination of a target, lens means for imaging said target, an opaque disk provided with a plurality of apertures, a prism cooperating with one of the apertures of said disk for producing a deviated image of said target and means for adjusting said prism to bring said deviated image into coincidence with an image formed by another aperture of said disk.

18. In an ophthalmometer, the combination of a target, lens means for imaging said target, an opaque disk provided with a plurality of apertures, a prism cooperating with one of the apertures of said disk for producing a deviated image of said target, means for adjusting said prism to bring said deviated image into coincidence with an image formed by another aperture of said disk and a device for indicating the adjustment of said prism directly in terms of corneal curvature of the eye.

19. In an ophthalmometer, the combination of a target, lenses for imaging said target, an ocular, an opaque disk between said lenses and ocular and provided with a plurality of apertures, a pair of prisms adjustably mounted between said ocular and disk for cooperation with horizontally aligned apertures of the disk to produce deviated images, of means for adjusting said prisms to bring said deviated images into coincidence with a reference image formed by another aperture of said disk and a device for indicating adjustment of said prisms directly in terms of corneal curvature of the eye.

CARL F. LOMB,
*Executor of the Estate of Gustav A. H. Kellner, Deceased.*
WILBUR B. RAYTON.